Feb. 24, 1959      H. L. WALKER      2,874,798
VAPOR LIQUID DISENGAGER AND DISTRIBUTOR
Filed April 15, 1957      3 Sheets-Sheet 1

INVENTOR.
H. L. WALKER
BY
Hudson and Young
ATTORNEYS

INVENTOR.
H. L. WALKER
BY
Hudson and Young
ATTORNEYS

United States Patent Office 2,874,798
Patented Feb. 24, 1959

2,874,798

VAPOR LIQUID DISENGAGER AND DISTRIBUTOR

Harry L. Walker, Bartlesville, Okla., assignor to Phillips Petroleum Company, a corporation of Delaware Application April 15, 1957, Serial No. 652,942

9 Claims. (Cl. 183—30)

This invention relates to a mixed phase feed distributor and a method for feeding a fractionating column. In one of its aspects, this invention relates to a mixed phase feed apparatus which allows the feed tray to operate normally in a bubble cap fractionating column. In still another aspect, this invention relates to an apparatus for distributing and separating a vapor-liquid feed in a fractionating column.

This is a continuation-in-part of my application Serial No. 411,647, filed February 23, 1954, now abandoned.

In the operation of a fractionating column, the column capacity can often be increased or better separations can be obtained by introducing the feed into the column at a position intermediate its top and bottom. That is, the feed is introduced between an upper rectifying zone and a lower stripping zone. The point of introduction of the feed into the column will depend upon the composition of the feed, the temperature, the pressure, degree of vaporization, etc. The selection of the optimum position is well within the skill of the art and frequently feed will be introduced at several levels in the column.

When operating a fractionating column by introducing the feed to the column at a position intermediate its top and bottom, the feed is first pre-heated partially vaporizing it. The hot feed is then introduced into the column at the desired position and additional feed will be vaporized depending upon the temperature and the column pressure. In the usual design, the feed will contain 40 to 95 volume percent vapor and the balance being liquid. When the feed is introduced into the column, the liquid will separate out (be disengaged) over a relatively small horizontal cross sectional area or will be impinged upon the vessel wall and will in either case unbalance the liquid flow. The gas will sweep upward and disrupt the natural rising vapor current. These disruptions interfere with the column operation and in effect will reduce the number of theoretical plates of the fractionation column. The problem is not as serious in packed column where the packing acts as baffles as it is in bubble cap tray columns.

It is an object of this invention to provide a vapor liquid disengager and distributor for introducing a mixed vapor liquid feed into a fractionating column. Another object of this invention is to provide a vapor liquid disengager and distributor particularly adapted for introducing a vapor liquid feed into a fractionating column of the bubble tray type. Still another object of this invention is to provide a method of introducing a mixed phase feed to a bubble tray column which allows the feed tray, in the column, wherein a mixed vapor liquid feed is introduced into the column at a position intermediate its top and bottom, to operate the same, or substantially the same, as other fractionating trays within the column.

The vapor-liquid disengaging and distributing device is located inside of a fractionating column and above a downcomer for the purpose of reducing the velocity of the entering feed, disengaging the liquid from the vapor, allowing the vapor to exit from the top of the distributor and rise to the tray above, and allowing the liquid to drop out of the bottom of the distributor and be distributed the length of the downcomer. The present invention reduces the velocity of the feed stream by providing a series of expansions and contractions which produce pressure losses (thus allowing the liquid and vapor to separate. The separation of vapor from liquid before the mixture starts down the downcomer reduces the load on the downcomer. The present invention is designed to be used between any given pair of trays and over a downcomer in channel type tray arrangement, the liquid entering the downcomer, while the vapor rises to the tray above. The apparatus of this invention is particularly suited to split-flow channel type tray arrangement wherein the disengager-distributor can be placed over a central downcomer. In order to obtain the maximum expansion and contraction chambers, the disengager should be centrally located over the tray. When placed over a central downcomer, simple vertical expansion chambers can be used. The present invention will take care of large amounts of liquid mixed with vapor and entering at high velocity without interfering with tray action on trays above or below the device. This apparatus can be used for introducing a feed consisting of substantially all liquid to one consisting of substantially all vapor. With these two extremes, the apparatus will be primarily a distributor. However, as has been heretofore said, under normal operating conditions, the feed will consist of 40 to 95 volume percent vapor.

This invention will be further explained by referring to the attached drawing of which:

Figure 1:
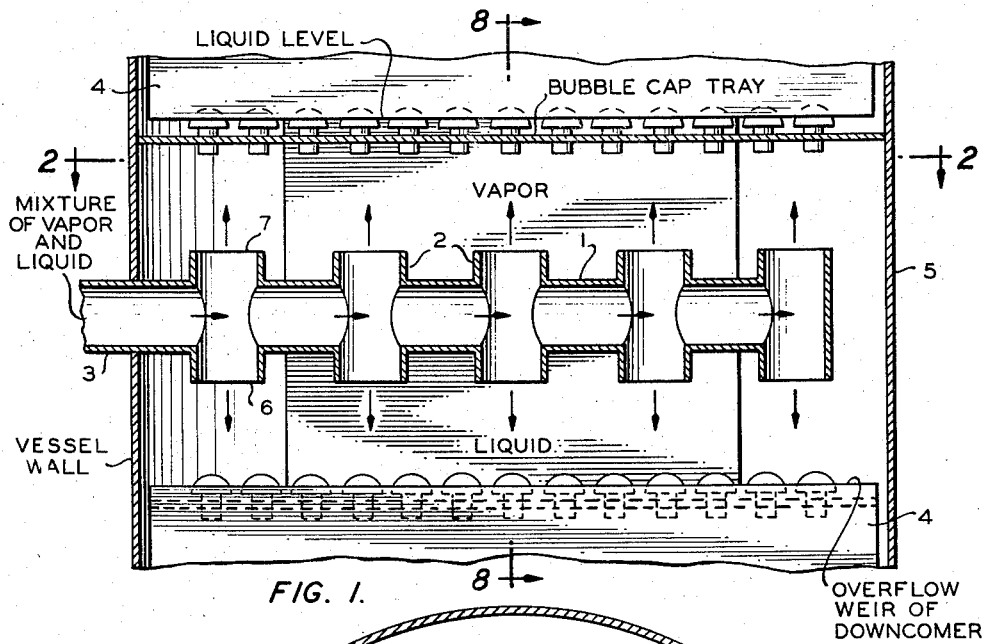
Figure 1 is a schematic vertical cross section showing an embodiment of the apparatus of this invention located in the feed section of a bubble cap fractionating column.
Figure 2:
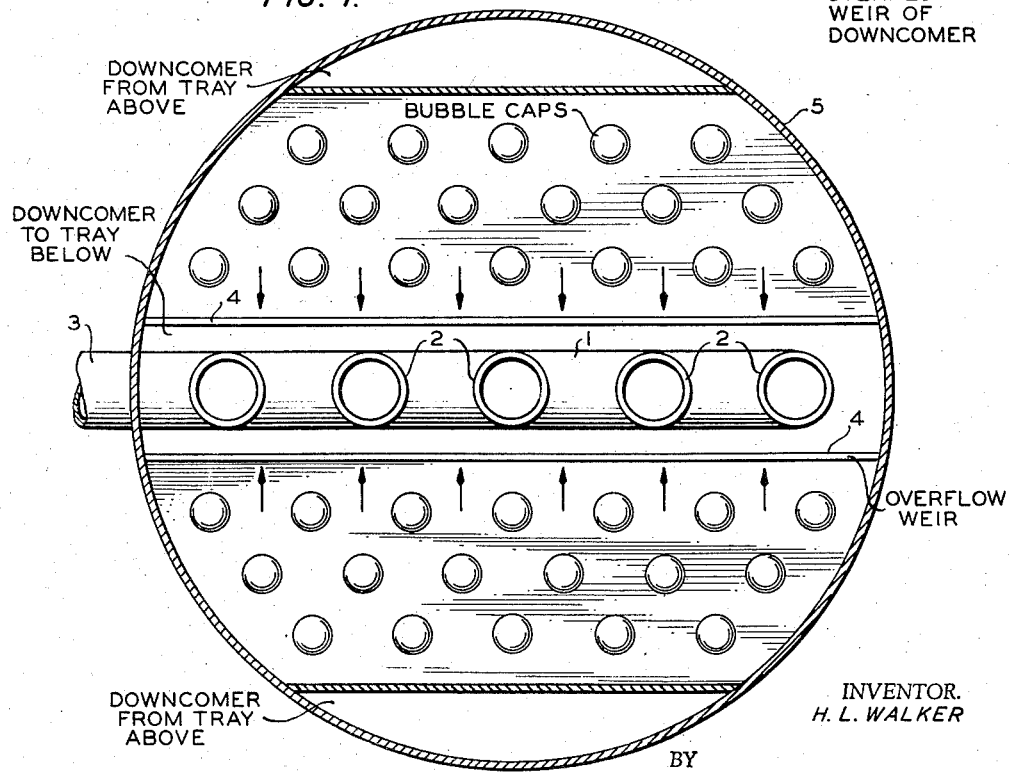
Figure 2 is a top view taken along 2—2 of Figure 1 showing how the apparatus of this invention can be located over a central downcomer in a bubble cap fractionating column of the split-flow type.
Figure 8:
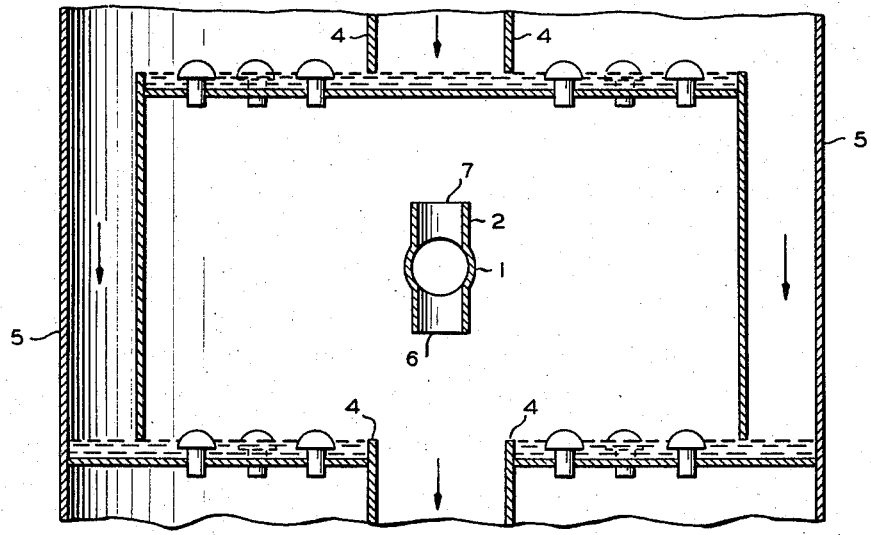
Figure 8 is a vertical section of the disengager taken along 8—8 of Figure 1.

Referring to Figure 1, the apparatus of this invention consists of a plurality of horizontal conduits 1 freely communicating with and joining a plurality of open end expansion chambers 2. A feed conduit 3 enters the first of the vertical chambers at approximately right angle thereto. The horizontal axes of the feed pipe and the plurality of horizontal sections are substantially longitudinally aligned one with the other. This apparatus is placed in the column 5 over a downcomer 4. This location is better shown in Figure 2 wherein the reference numerals are the same as those used in Figure 1.

Figure 3:
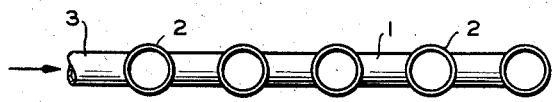
Figure 3 is a top view of the disengaging device wherein the expansion chambers have a greater diameter than do the horizontal chambers.
Figure 4:
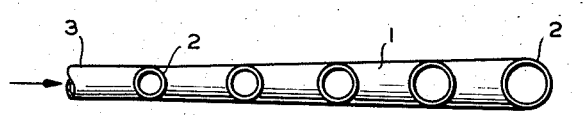
Figure 4 is a top view of a modification of the disengaging device wherein the disengaging device becomes progressively larger away from the inlet conduit.
Figure 5:
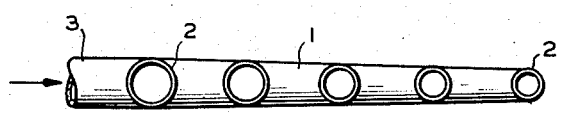
Figure 5 is a top view of a modification of the disengaging device wherein the disengaging device becomes progressively smaller from the inlet conduit.
Figure 6:
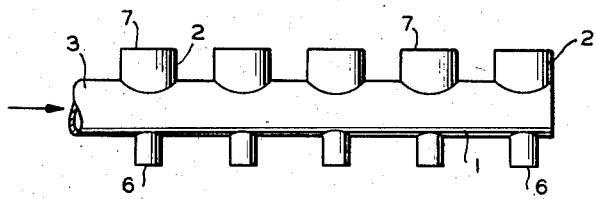
Figure 6 is a side view of a modification of the disengaging device wherein the gas outlets are larger than are the liquid outlets.
Figure 7:
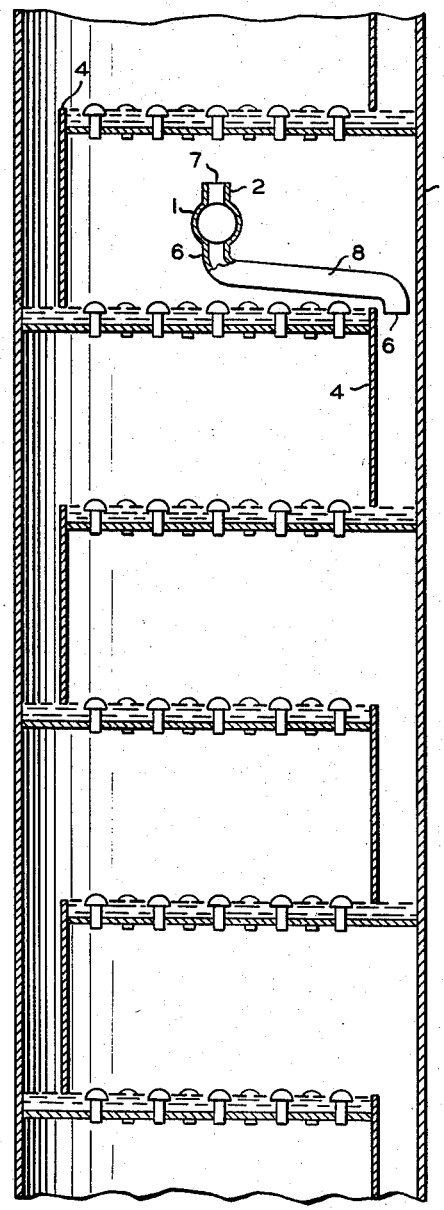
Figure 7 is a vertical section of a channel flow, bubble cap column showing the location of the disengager.
Figure 9:
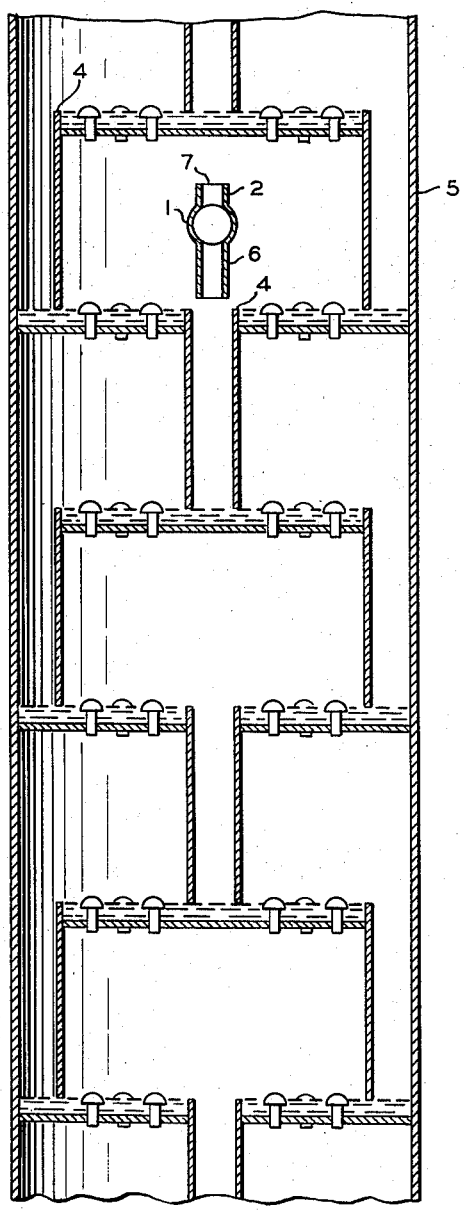
Figure 9 is a vertical section of a split flow bubble cap column showing the disengager over a central downcomer.

In Figure 1, an embodiment of this invention is shown wherein the expansion chambers are vertical and are equally spaced, the horizontal sections are of equal diameter and the vertical expansion chambers are of the same diameter as are the horizontal sections. In Figure 3, a modification is made wherein the vertical expansion chambers are of larger diameter than are the horizontal sections. Other modifications which can be made are spacing the expansion chambers at progressively greater or lesser distances apart, having the expansion chambers of progressively greater or smaller diameters (Figures 4 and 5), having the vapor exits of the expansion chamber larger or smaller than the liquid exits (Figure 6), having the horizontal sections of continuing enlarging or diminishing diameter, etc. (Figures 4 and 5). The particular design, will be dependent upon the nature and velocity of the entering feed. The apparatus will be so designed as to equally distribute the vapor and the liquid along the entire length of the apparatus. The important requirement is that the liquid outlets from the expansion chambers be directly over and distributed along a downcomer. If the apparatus is over a central downcomer as shown in Figure 9, then the expansion chambers will be vertical. If the downcomer is near the wall as in the case of cross flow trays, the disengager can be over the downcomer, or it will still be preferably placed near the center of the column, the liquid outlets will in this latter case bend toward the downcomer and open directly over it as shown in Figure 7. In the case of split flow, the disengager will generally be placed over a central downcomer. However it can be placed over the tray with the two downcomers near the walls. In this latter case, the entering feed conduit can divide and enter expansion and contraction chambers located over each downcomer, or the feed can enter a central disengager having outlet conduits running to each downcomer. The liquid outlets 6 from the disengaging device will open directly over a downcomer and will be so disposed as to distribute the liquid along the entire length of the downcomer. This is necessary to prevent the liquid from splashing onto the tray and thereby interrupting the tray action. The disengaging device will as a rule enter the column directly over a downcomer and will be horizontally disposed directly over the downcomer. However, the disengaging device can be located anywhere in the interspace between the trays with the liquid outlets 6 being at an angle from the horizontal sections 1 and being of sufficient length so as to open directly above the downcomer. In any event, a feed flowing through the apparatus will pass a plurality of expansion and contraction sections.

In the operation of this apparatus, a mixed hot liquid vapor feed from such conduit 3 will enter the first expansion chamber 2, where the feed will tend to expand reducing its velocity and part of the liquid will be disengaged and drop through liquid exit 6 and part of the gas will escape through vapor exit 7. The entering velocity of the feed will be such that the bulk of the feed will carry through the next contraction section on to the second expansion chamber where more liquid and gas will be separated out. This process will continue throughout the entire length of the apparatus. In the design of the apparatus, the feed rate and nature of the feed will have to be considered so that the apparatus design will be so that the entering velocity will be sufficient to carry gas and liquid the entire length of the apparatus.

In describing the apparatus of this invention, two embodiments have been illustrated while other embodiments have been indicated. Those skilled in the art will see many changes which can be made in this apparatus without departing from the scope of this invention. The drawings show only one such disengager in the column, however, those skilled in the art will realize that more than one such disengager can be employed, generally at different levels in the column.

I claim:

1. In a fractionating column of the channel flow bubble tray type, having a liquid downcomer between trays, in the free space between a selected pair of trays a single horizontal extension vapor-liquid disengager and distributor comprising in combination an inlet conduit, a plurality of spaced horizontal conduits having their horizontal axes in longitudinal alignment with each other and the inlet conduit, a plurality of spaced expansion chambers of enlarged vertical cross sectional area, each said expansion chamber being spaced between pairs of the said horizontal conduits respectively and freely communicating with the adjacent horizontal conduits, an expansion chamber at the end of the horizontal conduit most removed from the inlet conduit, each expansion chamber having a gas outlet at its upper end and a liquid outlet at its lower end, and the resulting combination having the said liquid outlets disposed directly over and spaced parallel to a downcomer.

2. In a fractionating column of the split-flow bubble tray type having a central downcomer on alternate trays, in the free space between a selected pair of trays a single horizontal extension vapor-liquid disengager and distributor comprising in combination an inlet conduit; a plurality of horizontally spaced vertical cylindrical expansion chambers, each said vertical chamber having a vapor exit at its upper end and a liquid exit at its lower end; a plurality of horizontal cylindrical contraction chambers, each of said horizontal chambers communicating with and joining a pair of said vertical chambers, the vertical cross sectional area of the vertical chambers being greater than the vertical cross sectional area of the horizontal chambers; the plurality of horizontal chambers and the inlet conduit having their horizontal axes in longitudinal alignment; and the resulting combination being disposed directly above and parallel to a central downcomer.

3. The apparatus of claim 2 wherein the horizontal chambers have uniform and equal diameters, the vertical chambers are equally spaced and the diameters of the vertical chambers are substantially the same as the diameter of the horizontal chambers.

4. The apparatus of claim 2 wherein the horizontal chambers have uniform and equal diameters, the vertical chambers are equally spaced, and the vertical chambers have equal diameters of greater dimension than the diameter of the horizontal chambers.

5. The apparatus of claim 2 wherein the horizontal and vertical chambers have a continually increasing diameter from the inlet conduit.

6. The apparatus of claim 2 wherein the vertical chambers are equally spaced but wherein the gas outlets are greater than are the liquid outlets.

7. The apparatus of claim 2 wherein the horizontal chambers have a continuously decreasing diameter away from the inlet conduit.

8. A process for introducing a vapor-liquid feed into a fractionating column of the bubble tray type having liquid downcomers communicating between trays, the feed being introduced into the interspace between two trays located intermediate the top and bottom of the column in such a manner as not to interfere with the normal operation of the said trays, the said process comprising passing the said feed horizontally through a series of zones of enlarged and restricted cross sectional area respectively, withdrawing a portion of the liquid and vapor from each zone of enlarged cross sectional area until all of the said liquid and vapor is withdrawn, distributing the gas to the interspace between the said two trays, and distributing the said withdrawn liquid into and along the length of a downcomer projecting from the lower of the two said trays.

9. In a column of the tray type having liquid downcomers between trays, a pair of trays having in the free space therebetween a single horizontal extension vapor-liquid disengager and distributor comprising in combination an inlet conduit, a plurality of spaced horizontal conduits freely communicating with and connecting in pairs a plurality of spaced vertical open end chambers, said horizontal conduits and said vertical open end chambers being in substantially straight alignment one with the other and said inlet conduit, and each said open end chamber having a gas outlet at its upper end and a liquid outlet at its lower end and the resulting combination having the said liquid outlets disposed over and parallel to a downcomer.

References Cited in the file of this patent

UNITED STATES PATENTS

| | | |
|---|---|---|
| 1,850,930 | Heid | Mar. 22, 1932 |
| 2,338,010 | Ridgway | Dec. 28, 1943 |
| 2,646,266 | Lockwood | July 21, 1953 |
| 2,658,863 | Guala | Nov. 10, 1953 |

FOREIGN PATENTS

| | | |
|---|---|---|
| 463,527 | Italy | May 12, 1951 |